United States Patent [19]

Moore et al.

[11] 4,040,344
[45] Aug. 9, 1977

[54] FEED ROLLER MECHANISMS FOR FORAGE HARVESTERS

[75] Inventors: George Edgar Moore; Alan Francis Morris, both of Ashburton, New Zealand

[73] Assignee: Dehye Harvesters Limited, Ashburton, New Zealand

[21] Appl. No.: 635,541

[22] Filed: Nov. 25, 1975

[30] Foreign Application Priority Data

Dec. 2, 1974 New Zealand .................. 176089

[51] Int. Cl.² .................................................. B30B 3/04
[52] U.S. Cl. ................................... 100/95; 100/171; 100/172; 56/1; 241/223
[58] Field of Search ............... 56/1; 100/94, 95, 171, 100/169, 170, 172, 153; 241/222, 223

[56] References Cited

U.S. PATENT DOCUMENTS

| 496,260 | 4/1893 | Haugen | 100/95 |
|---|---|---|---|
| 2,150,984 | 3/1939 | Near et al. | 100/95 |
| 2,716,318 | 8/1955 | Skromme | 56/1 |
| 2,829,587 | 4/1958 | Russell | 100/171 |
| 2,998,834 | 9/1961 | Carlson | 241/223 |
| 3,110,245 | 11/1963 | Kuehlman | 100/95 X |
| 3,436,028 | 4/1969 | Koehnen | 100/95 X |

FOREIGN PATENT DOCUMENTS 856,971  12/1952  Germany .................. 241/223

*Primary Examiner*—Billy J. Wilhite
*Attorney, Agent, or Firm*—Ladas, Parry, Von Gehr, Goldsmith & Deschamps

[57] ABSTRACT

The invention comprises a feed roller mechanism for use with forage harvesters adapted for picking up cut forage material from the ground and thereafter moving said forage material up a conveyor to a feed roller mechanism which grips and compresses the forage materials sufficiently for it to be passed to a cutter whereafter the forage material may be cut into small pieces and moved to a storage container for transportation and/or processing. The apparatus provides a feed roller mechanism having a roller or rollers biased by an adjustable thruster towards an upper end of a conveyor and able to move substantially vertically relative thereto, said feed roller mechanism being prevented from tilting or rocking relative to the conveyor by a tie-bar to cause the feed roller or rollers to exert increased pressure on any forage material building up to one side of the conveyor, adjusting means provided on the thruster to enable the feed roller mechanism to be capable of being raised clear of the conveyor for removal of clogged or foreign material and also to enable the bias of the feed roller mechanism towards the conveyor to be substantially adjustable to suit the type of forage material being harvested.

9 Claims, 3 Drawing Figures

FEED ROLLER MECHANISMS FOR FORAGE HARVESTERS

This invention relates to improvements to forage harvesters and in particular to improved feed roller mechanisms for forage harvesters.

Many known forage harvesters incorporate therein means for picking up cut forage material from the ground, and a conveyor for raising the forage up to a feed roller mechanism provided at its upper end which mechanism securely grips and compresses the forage sufficiently for it to be passed to a cutter, for example a drum cutter assembly operating against a cutter bar, such that forage material may be chopped into relatively small pieces and thereafter be moved such as by blowing and the like to a storage container for later transportation and/or processing.

It has been a problem in the past with many known feed roller mechanisms operating at an upper end of a conveyor and substantially adjacent the cutter and cutter bar that said feed roller mechanisms are normally biased downwardly towards the upper end of the conveyor by biasing means, such as for example tension springs and the like, connected independently about the axis of said roller or rollers to each side thereof such that the roller or rollers are biased towards the upper end of the conveyor.

It has been found that when in use, several problems arise when the above configuration and others adapted to independently bias the feed roller or rollers towards the conveyor are provided. For example, when a quantity of forage material travels up one side of the conveyor, the feed roller mechanism tends to lift on that side or rock, and is then unable to compress the forage material sufficiently and said forage material is fed into the cutter in a thick wad and tends to attain the cutter. In some cases, for example when a drum cutter is used, the forage material may build up above the longitudinal axis of the cutter drum and this can lead to choking and clogging of the cutter drum. It will also be understood that should any forage material build up above the longitudinal axis of the cutter drum, extra power is required to drive the cutter drum against the oncoming forage material, and consequently the forage material is cut less efficiently.

Furthermore feed rollers so mounted as hereinbefore described have been found to be difficult to clear of clogged forage or foreign material, in that the feed rollers are normally permanently biased towards the conveyor and clearing of said rollers is indeed difficult. In such a case, either the operator must remove the biasing means from the feed rollers, which is a complex operation in the field, or otherwise devise a method of propping the feed rollers upwardly away from the conveyor by a bar, piece of timber and the like, this practice being dangerous as the bar or piece of timber may become accidentally dislodged and the feed roller would then return under the bias and could catch an operator's arm or other appendage therein, causing injury.

It is an object of this invention to devise a feed roller mechanism which minimizes the disadvantages hereinbefore mentioned, wherein there is provided a feed roller mechanism which has the feed roller or rollers biased towards the upper end of the conveyor and capable of substantially vertical movement relative thereto, and being additionally capable of resisting tilting or rocking relative to the conveyor when forage material builds up to one side of the conveyor.

It is a further object of this invention to provide a feed roller mechanism which has means to enable said feed roller mechanism to be raised clear of the conveyor for removal of clogged forage or foreign material.

It is a still further object of this invention to provide a feed roller mechanism in which a downward bias is capable of adjustment.

Other objects and advantages of the present invention will become apparent from the ensuing description.

According to this invention therefore, there is provided in a forage harvester having a frame, an inclined movable conveyor means and cutting means positioned adjacent the upper end of said conveyor means, a feed roller mechanism comprising at least one feed roller in a roller housing and having a longitudinal axis of rotation lying transverse to the movement of said conveyor means, said roller housing being situated above the upper end of said conveyor means and adjacent said cutting means, and being mounted within said harvester for limited vertical movement, biasing means in the form of a longitudinal thruster means arranged to bias said roller housing towards said conveyor means and situated substantially centrally above said housing and mounted to the frame of the forage harvester, the bias of said thruster means being adjustable, tie means linking said housing to said forage harvester to guide said limited vertical movement relative to said forage harvester to be substantially parallel to the longitudinal axis of the thruster means, whereby forage material travelling up the conveyor and onto the cutting means will pass beneath said feed roller mechanism in a direction transverse to said longitudinal axis of rotation of said roller and be compressed by said roller, and said feed roller mechanism is prevented from rocking or tilting movement about an axis substantially transverse to the longitudinal axis of rotation of said roller such that the pressure applied by the roller is substantially uniform along its length, and adjusting means enabling the bias on said feed roller mechanism to be varied and to enable it to be raised by such thruster means to clear clogged material therefrom.

Furthermore according to a preferred form of this invention, there is provided in a forage harvester having a frame, an inclined movable conveyor means and cutting means positioned adjacent to the upper end of the movable conveyor means; a feed roller mechanism comprising two feed rollers mounted for driven rotation in a roller housing with their longitudinal axis of rotation spaced substantially in parallel and lying transverse to the movement of said conveyor means, said roller housing being situated above the upper end of said conveyor means and adjacent said cutting means; a longitudinal thruster means situated substantially centrally above said roller housing and having its longitudinal axis substantially vertical, said thruster means being arranged to bias said roller housing towards said conveyor means, a thrust rod extending downwardly from said thruster means and having its lower end pivotally connected to a transverse bar extending transverse to the direction of movement of said conveyor means; a pair of pressure rails having their one ends rigidly connected to said bar, the other ends of said pressure rails forming a pivotal connection on said roller housing to pivot about an axis lying transverse to the movement of said conveyor means; a tie bar assembly providing a pivotal connection with said bar and with the frame of said forage harvester and enabling a limited pivotal motion of said housing relative to said frame without tilting about an axis lying transverse to the longitudinal axes of said rollers, whereby forage material travelling up the conveyor and onto the cutting means will pass beneath the rollers in a direction transverse to the longitudinal axes of the rollers and be compressed by the rollers; adjusting means enabling the bias on the roller housing to be adjusted to vary the compression applied to the forage by said rollers and to enable the raising of the rollers.

The invention will now be described by way of example in this form with reference to the accompanying drawings in which.

Figure 1:
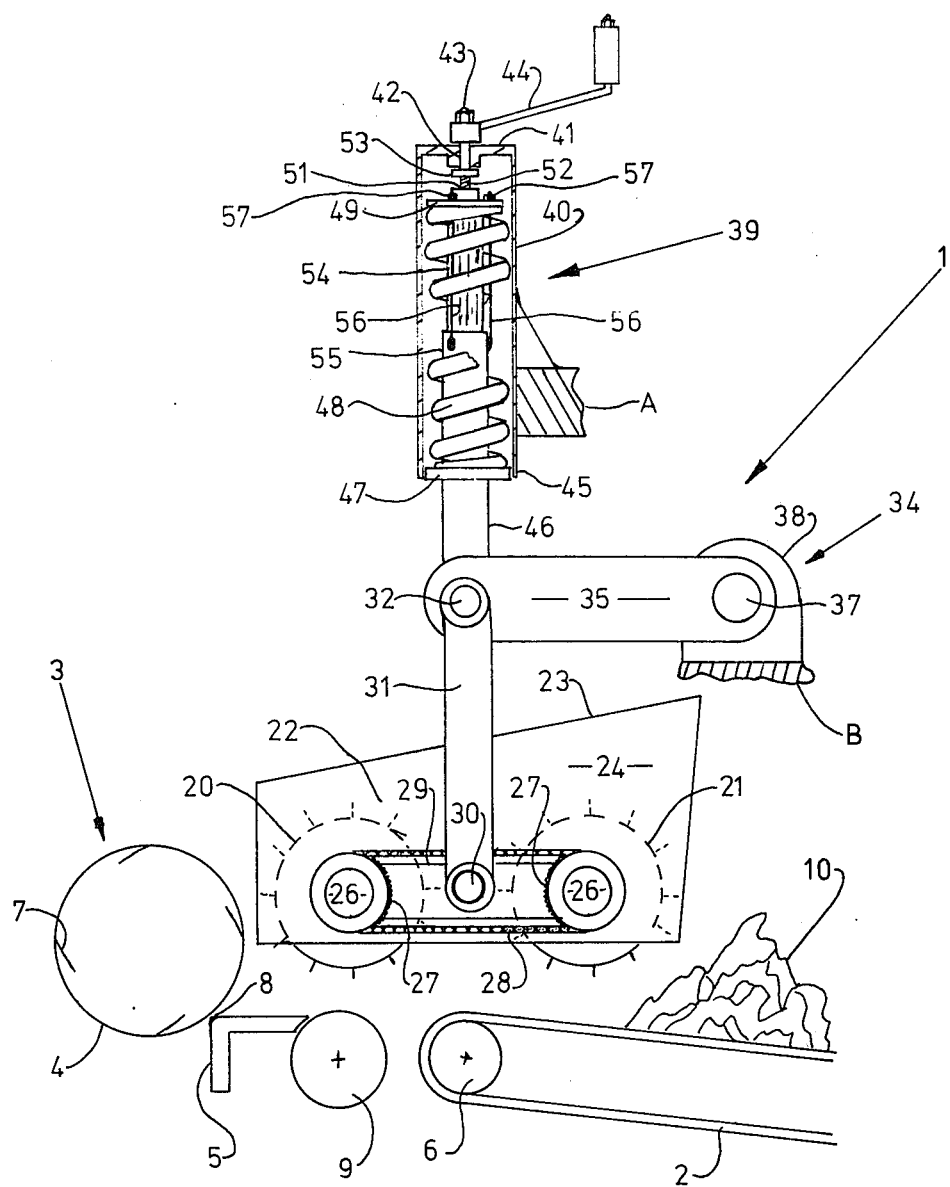
FIG. 1 is a diagrammatic side elevation illustrating the general arrangement in a forage harvester of a feed roller mechanism according to the invention and forage material being fed up the conveyor to the feed roller mechanism and the feed roller mechanism leading on to a cutting means.

The feed roller mechanism as indicated by arrow 1 in FIG. 1 is mounted substantially above an upper end of an inclined conveyor 2 and adjacent a cutting means indicated by arrow 3 comprising a cutter drum 4 operating against a cutter bar 5. Preferably the conveyor 2 is provided with a plurality of interconnected links and has an upper roller 6 mounted substantially medially below the feed roller mechanism 1.

The cutting means 3 is preferably mounted after the feed roller mechanism 1, the cutter bar being situated substantially in line with the upper roller 6 of the conveyor 2. The cutter drum 4 is substantially cylindrical and has a plurality of cutters 7 thereon so adjusted as to provide a cutting action on an apex 8 of the cutter bar 5 on rotation of the cutter drum 4 about its longitudinal axis. A support roller 9 is provided between the upper roller 6 of the conveyor 2 and the cutter bar 5 so as to provide additional support for forage material 10 when passing between the conveyor 2 and the cutter bar 5.

Forage material 10 is arranged to travel up the conveyor 2 and whilst at the upper end of the conveyor 2 will pass beneath the feed roller mechanism 1, and be compressed therebetween and pass to the cutter bar 5. On passing over the cutter bar 5 the forage material 10 will be severed by the blade or blades 7 of the cutter drum 4 and then be discharged rearwardly of the cutting means 3 for subsequent discharge into a container and the like.

Figure 3:
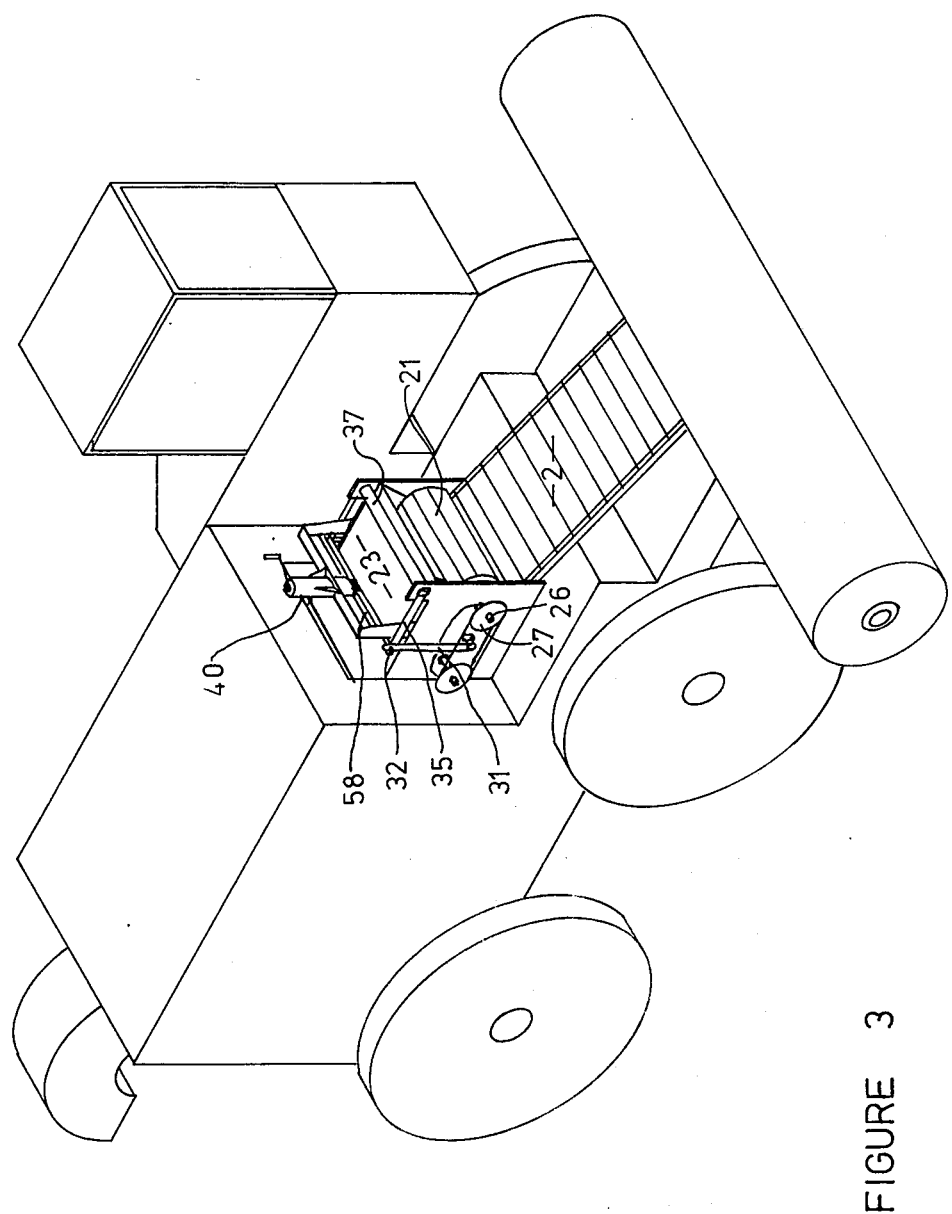
FIG. 3 is a diagramatic side elevation of a typical forage harvester indicating the disposition therein of the feed roller mechanism of this invention.

The feed rollers of the feed roller mechanism 1 are preferably formed in a durable material such as for example steel and the like and said feed roller mechanism 1 is mounted to structural fixtures of the forage harvester such as the frame thereof in at least two positions A and B, thereon such that the feed roller mechanism 1 may be maintained substantially securely in position relative to other operating integers of the forage harvester as shown in FIG. 3.

Figure 2:
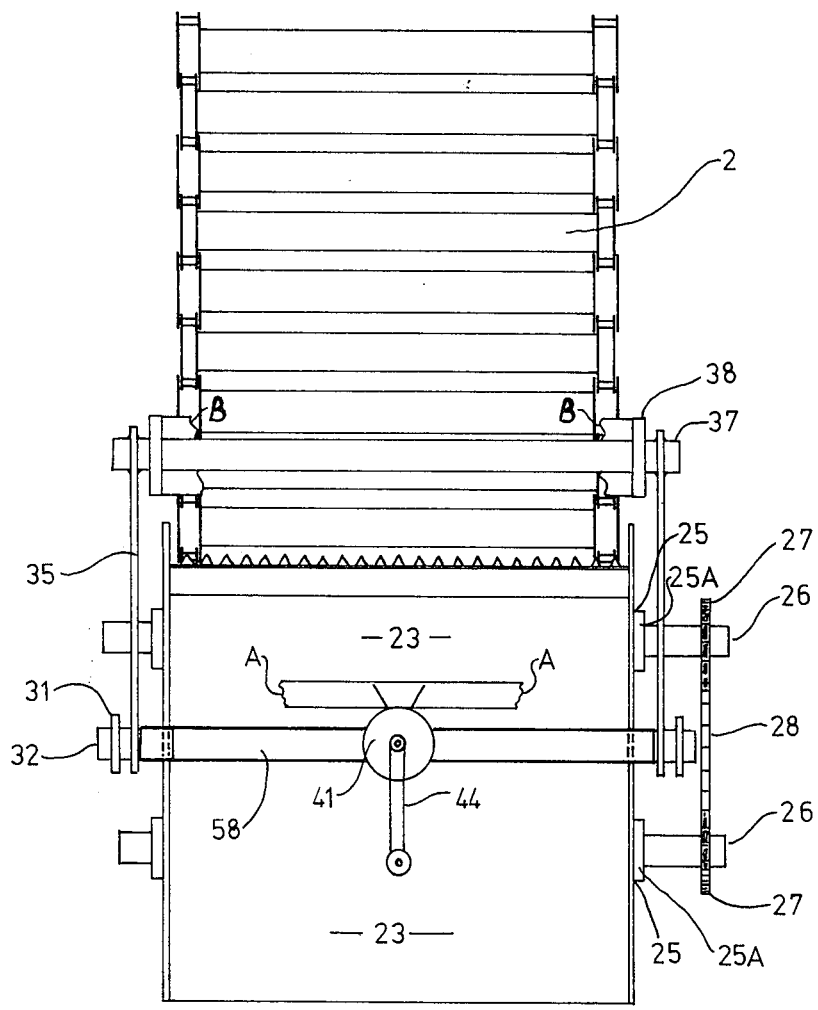
FIG. 2 is a diagramatic plan view of the arrangement as shown in FIG. 1.

The feed roller mechanism 1 comprises in the preferred form of the invention as shown in FIGS. 1 and 2 of the drawings, two feed rollers 20 and 21 mounted with their axes substantially parallel with one another but spaced apart from each other within a housing 22, said housing being formed in sheet material, such as for example sheet metal and also being arranged having an upper portion 23 extending substantially over the upper portion of the said feed rollers 20 and 21 and having side portions 24 extending substantially downwardly with apertures 25 therein containing transversely aligned bearings 25a into which axles 26 of the feed rollers 20 and 21 extend.

The feed rollers 20 and 21 in the preferred embodiment of the invention are connected with a drive mechanism by such as for example a chain drive mechanism comprising cogs 27 provided on the rollers 20, 21 cooperating with a link chain 28 passing around said rollers 20 and 21. The chain is arranged to be driven by drive means (not shown) such that positive rotation may be imparted to the rollers 20 and 21 commensurate with travel of the conveyor 2 such that the feed rollers 20 and 21 may assist the travel of forage material 10 into the cutting means 3.

A reinforcing member 29 is provided on each opposed external side portion 24 of the housing 22 so as to strengthen these portions of said housing 22 between the apertures 25 and bearings 25a. A pressure rail 31 is provided on each side and connected by a pivotal connection 30 substantially medially of each reinforcing member 29, said pressure rail 31 being in connection with a thruster 39 and a tiebar assembly 34, which are mounted on the frame of the forage harvester and said pressure rails 31 extend substantially upwardly from said pivotal connections 30 on each side of the housing 22 such that the housing 22 and therefore the rollers 20 and 21 may pivot on said pivots 30 to a limited degree. The pressure rails 31 extend upwardly to a transverse bar 32 which extends substantially transversely above the frame 22 and to which the thruster 39 and the tie-bar assembly 34 are connected.

Positive location of the housing 22 is effected by the tie-bar assembly 34, said tie-bar assembly 34 comprising a pair of tie-bar members or arms 35, one of the ends thereof being connected pivotally with the transverse bar 32 adjacent the connection of the pressure rails 31 with the transverse bar 32. Arms 35 are rigidly connected by a transverse member 37, which member is securely but pivotally mounted to a fixture (B) of the frame of the forage harvester by at least two bearings 38 mounted spaced from one another. Thus it will be seen that the arrangement allows the housing 22 to be lifted substantially vertically, bodily, with the tie-bar assembly 34 acting as a rigid pivoting link, however the tie-bar assembly 34 will prevent any rocking or tilting of the housing about an axis parallel with the direction of movement of the conveyor, i.e. lifting of one side thereof further than the other.

The thruster 39 is preferably mounted substantially medially above the transverse bar 32 and therefore substantially medially above the housing 22, said thruster 39 being securely mounted to the other fixture (A) on the frame of the forage harvester so as to securely mount said thruster 39 relative to the forage harvester.

The thruster 39, comprises a substantially cylindrical housing 40 mounted substantially vertically and having an upper end 41 substantially blanked off, and a lower end 45 of the thruster 39 is formed with an open end therein having a thrust tube 46 extending outwardly therefrom and being connected to a mid-portion of a transverse tube 58 through which the transverse bar 32 passes such that said thrust tube 46 is positively connected via the transverse bar 32 and pressure rails 31 to the housing 22.

The thrust tube 46 extends into the lower portion of the cylindrical housing 40 and is provided at the midpoint thereof with a bearing plate 47. The upper end 55 of the thrust tube 46 is adapted to fit within a lower end of a biasing means 48, for example a compression spring housed within said cylindrical housing 40. The upper end of the biasing means 48 or compression spring is adapted to engage against a compression plate 49 within the upper portion of the cylindrical housing 40. An adjusting means comprising an elongate shaft 43 is received and mounted within an aperture 42 formed within the upper blanked off end 41, of the housing 40, said elongate shaft 43 having a crank 44 mounted on its outer end substantially exteriorly of said housing 40.

The elongate shaft 43 is provided at the point it passes through the upper blanked off end 41 of the housing 40 with an abutment means 53 arranged to abut, inside the housing 40, against the aperture 42 in the upper blanked off end 41, and said compression plate 49 is threadably engaged through a substantially centrally situated threaded aperture 51 on a threaded portion 52 of the elongate shaft 43, such that upon rotation of the elongate shaft 43 by the crank 44, the compression plate 49 may be moved vertically relative to the cylindrical housing 40.

The relationship between the compression plate 49, the biasing means 48 and the bearing plate 47 is maintained by providing the compression plate 49 with a tubular member 54 arranged to telescope within the upper end 55 of the thrust tube 46 as the biasing means 48 is compressed or extended. The tubular member 54 is maintained as a unit with the biasing means 48 and the thrust tube 46 by virtue of upwardly extending rods 56 fixed to the outside of the upper end 55 of the thrust tube 46, the rods 56 passing inside the biasing means 48 and through apertures provided in the compression plate 49. The upper ends of the rods 56 are threadably engageable with lock units 57 which maintain the compression plate 49, biasing means 48 and bearing plate 47 together as a unit.

The elongate shaft 43 also extends further downwardly from the compression plate 49 through the tubular member 54 and the upper end 55 of the thrust tube 46, which tubular members are positioned within the biasing means 48, such that rotation of the crank 44 and hence the elongate shaft 43 will raise or lower the thrust tube 46 relative to the cylindrical housing 40.

It will be seen that the hereinbefore described assembly is capable of biasing the housing 22 and consequently rollers 20 and 21 downwardly against the upper end of the conveyor 2 situated therebelow and as the forage material 10 travels upwardly of the conveyor 2 and contacts the roller 21 said housing 22 may rock pivotally on its pivotal mounting about an axis transverse to the direction of movement of the conveyor so as to provide even pressure on the rollers 20 and 21 as it compresses the feed 10. The rollers 20 and 21 in being driven assist the passage of the forage material 10 into the cutter means 3 whilst additionally compressing said forage material.

On forage material building up to one side of the conveyor the housing 22 will be prevented from rocking or lifting on one side thereof about an axis parallel to the movement of the conveyor to cause a reduction in the compressive force acting on said built-up forage material 10 by virtue of existence of the tie-bar assembly 34 since the tie-bar 35 ensures that the housing 22 will be lifted bodily and substantially vertically parallel to the longitudinal axis of the thruster 39 mounted thereabove by this built-up forage material and against the bias of spring 48. As a result, increased pressure is maintained on the thick end or built-up portion of forage material 10 by spring 48 and therefore increased compression of the forage material is produced to reduce the effective height of the forage material 10 as it is passed to the cutting means 3.

It will be seen that on the housing 22 being bodily lifted as hereinbefore described, the thrust tube 46 will force upwardly against the bias of the compression spring 48 and thus compression of the forage material 10 will be maintained.

Depending on the type of forage material required to be compressed before cutting by the cutting means, the feed roller mechanism may be adjusted in its bias towards the conveyor by rotation of the crank 44 of the thruster 39 so as to rotate the elongate shaft 43 whereby the threaded portions 52 thereof causes an upward or downward movement of the compression plate 49 which alters the compression in the compression spring 48 to a desired degree so as to suit the type of forage material being compressed.

If the forage harvester should however become clogged in any manner, the feed roller mechanism may be raised clear of the conveyor such that the operator may reach in and clear the moving parts of forage or foreign material by rotating the crank 44 in a predetermined direction so that the threaded portion of the elongate shaft 43 extending into the threaded aperture 51 provided on the compression plate 49 is raised by the raising of the unit consisting of the compression plate 49, biasing means 48, bearing plate 47 and the thrust tube 46 so that the thrust tube 46 is raised thereby bodily raising the pressure rails 31 and frame 22 to clear the feed roller mechanism from the conveyor.

Thus by this invention there is provided a feed roller mechanism for forage harvesters which enables substantially efficient operation and which is maintained is such a position that the rollers thereof are mounted to prevent rocking or tilting thereof along their length so as to exert compression on unevenly distributed forage material and wherein said compression bias is substantially adjustable and wherein said feed roller mechanism may be raised clear for clearing of clogged forage or foreign material.

We claim:

1. In a forage harvester having a frame, an inclined movable conveyor and cutting means positioned adjacent the upper end of the movable conveyor; a feed roller mechanism comprising a roller housing and at least one feed roller in said housing and having a longitudinal axis of rotation lying transverse to the movement of said conveyor, said roller housing being situated above the upper end of said conveyor and adjacent said cutting means, and being mounted within said harvester for limited vertical movement, an adjustable biasing means in the form of an elongate thruster arranged to allow the bias of said roller housing towards said conveyor to be adjusted, the elongate thruster being situated substantially centrally above said housing and mounted to the frame of the forage harvester, tie means linking said housing to said forage harvester to guide said limited vertical movement relative to said forage harvester substantially parallel to the longitudinal axis of the thruster, whereby forage material travelling up the conveyor and onto the cutting means will pass beneath said feed roller mechanism in a direction transverse to said longitudinal axis of rotation of said roller and be compressed by said roller, and said feed roller mechanism is prevented from rocking or tilting movement about an axis substantially transverse to the longitudinal axis of rotation of said roller such that the pressure applied by the roller is substantially uniform along its length, and said adjustable biasing means enables the bias on said feed roller mechanism to be varied and to be raised by said thruster to clear clogged material therefrom.

2. A feed roller mechanism as claimed in claim 1, wherein at least two of said feed rollers are provided in the feed roller mechanism and are adapted to be driven in connection with one another and drive means are provided in driving connection with said rollers and so arranged that a positive rotation can be imparted to the feed rollers by the drive means commensurate with travel of the conveyor.

3. A feed roller mechanism as claimed in claim 1, comprising at least two feed rollers mounted in the roller housing, and longitudinal axles on which the feed rollers are mounted with their longitudinal axes of rotation spaced substantially parallel to one another, said roller housing having an upper portion extending substantially above the feed rollers and having side portions extending downwardly, said side portions having apertures therein containing substantially transversely aligned bearings in which said longitudinal axles are mounted.

4. A feed roller mechanism as claimed in claim 1, wherein the roller housing has side portions provided with reinforcing members provided thereon, a transverse bar provided as the connection between the thruster and the tie means, and a pressure rail extending substantially upwardly from each reinforcing member to said transverse bar, whereby said tie means and thruster are in connection with said roller housing via said transverse bar and said pressure rails.

5. A feed roller mechanism as claimed in claim 1, wherein the roller housing has side portions provided with reinforcing members thereon to strengthen the housing, apertures in the reinforced side portions of the housing, bearings positioned in the apertures, an axle which is mounted in the bearings and on which the roller is mounted, pressure rails pivotally connected to reinforcing members, one to either side of said housing, a transverse bar connected between said pressure rails, said thruster and tie means being connected to said transverse bar, whereby said roller housing is able to pivot on said pivotal connections to a limited degree, relative to the tie means and thruster and about an axis transverse to the direction of movement of said conveyor.

6. A feed roller mechanism as claimed in claim 1 wherein the roller housing has side portions provided with reinforcing members provided thereon, a transverse bar provided as the connection between the thruster and the tie means and a pressure rail extending substantially upwardly from each reinforcing member to said transverse bar, whereby said tie means and thruster are in connection with said roller housing via said transverse bar and pressure rails, said tie means comprises a tie-bar assembly formed by a pair of spaced arms, the one ends of which are pivotally connected to said transverse bar and the other ends of which are connected together by a transverse member, at least two spaced bearings being provided for said transverse member on the frame of said forage harvester to enable its pivotal movement therein, whereby the arms may pivot in unison about either of their ends such that tilting or rocking of the tie-bar assembly about an axis parallel to the arms is prevented yet vertical movement of the housing is facilitated.

7. A feed roller mechanism as claimed in claim 1, wherein the thruster comprises a substantially cylindrical housing mounted substantially vertically and having an upper end and a lower end, said upper end being closed, the lower end of the cylindrical housing having an opening therein, a thrust tube provided within the cylindrical housing and extending downwardly therefrom, a transverse tube which is connected to an outer end of the thrust tube at mid-point thereof, the transverse tube extending transverse to the movement of said conveyor, the transverse tube being pivotally mounted on a transverse bar positioned between a pair of pressure rails connected between said transverse tube and said roller housing, a pivotal connection being provided between said pressure rails and said roller housing, the thrust tube extending into the lower portion of the cylindrical housing, which is positioned in the cylindrical housing and to which an upper end of the thrust tube is rigidly connected, a biasing member provided in said cylindrical housing and having a upper end and a lower end, a bearing plate resting against said lower end of the biasing member, a compression plate in the upper end of the cylindrical housing and in contact with which said upper end of the biasing member lies, and adjusting means provided in connection with said compression plate for adjusting the bias of said biasing member whereby the compression of the rollers in the forage can be varied and the rollers also raised.

8. A feed roller mechanism as claimed in claim 1, wherein the thruster comprises a substantially cylindrical housing mounted substantially vertically and having an upper end and a lower end, said upper end being closed, the lower end of the housing having an opening therein, a thrust tube provided within the housing and extending outwardly therefrom, a transverse tube connected at the mid-portion thereof to an outer end of the thrust tube, the transverse tube extending transversely of the direction of movement of said conveyor, a transverse bar upon which the transverse tube is mounted, a pair of pressure rails between which the transverse bar is positioned, the pair of pressure rails being connected to said transverse tube, a pivotal connection being provided between said pressure rails and said roller housing, the thrust tube extending into the lower end of the cylindrical housing, a bearing plate rigidly connected to the upper end of the thrust tube, a compression spring mounted in said cylindrical housing and having an upper end and a lower end, the lower end of the spring resting against the bearing plate, a compression plate which is positioned within the upper end of the cylindrical housing and against which the upper end of the compression spring lies in contact, adjusting means for adjusting the bias of said compression spring comprising an elongate shaft which has a threaded portion and is received and positioned within an aperture formed in the closed end portion of the said cylindrical housing, an abutment on the elongate shaft which bears against the closed end portion of the cylindrical housing adjacent the aperture therein, said elongate shaft having a crank mounted on its upper and exteriorly of said cylindrical housing, and means providing a substantially centrally situated threaded aperture through said compression plate through which the threaded portion of said elongate shaft is threadably engaged, such that upon rotation of the elongate shaft by the crank, the compression plate may be moved vertically relative to the cylindrical housing so as to vary the bias of the compression spring acting on said roller housing and so that the roller housing may be raised.

9. In a forage harvester having a frame, an inclined movable conveyor and cutting means positioned adjacent to the upper end of the movable conveyor; a feed roller mechanism comprising two feed rollers mounted for driven rotation in a roller housing with their longitudinal axes of rotation spaced substantially in parallel and lying transverse to the movement of said conveyor, said roller housing being situated above the upper end of said conveyor and adjacent said cutting means; an elongate thruster situated substantially centrally above said roller housing and having its longitudinal axis substantially vertical, said thruster being arranged to bias said roller housing torward said conveyor, a thrust tube extending downwardly from said thruster, a transverse tube connected to a lower end of the thrust tube, the transverse tube extending transverse to the direction of movement of said conveyor, a transverse bar on which the transverse tube is pivotally mounted, a pair of pressure rails between which the transverse bar is positioned, the pair of pressure rails having their one ends rigidly connected to said tube, the other ends of said pressure rails forming a pivotal connection on said roller housing to enable said roller housing to pivot about an axis lying transverse to the movement of said conveyor, a tie-bar assembly providing a pivotal connection with said bar and with the frame of said forage harvester and enabling a limited pivotal motion of said housing relative to said frame without tilting about an axis lying transverse to the longitudinal axes of said rollers, whereby forage material travelling up the conveyor and onto the cutting means will pass beneath the rollers in a direction transverse to the longitudinal axes of the rollers and be compressed by the rollers; adjusting means provided to enable the bias on the roller housing to be adjusted to vary the compression applied to the forage by said rollers and to enable the raising of the rollers.

* * * * *